J. D. DEVOSS.
COOLER AND ASPIRATOR.
APPLICATION FILED JAN. 17, 1908.

911,952.

Patented Feb. 9, 1909.
2 SHEETS—SHEET 1.

WITNESSES:
J. H. Gardner.
M. D. Beaty.

INVENTOR:
James D. Devoss,
BY
E. T. Silvius,
ATTORNEY.

J. D. DEVOSS.
COOLER AND ASPIRATOR.
APPLICATION FILED JAN. 17, 1908.

911,952.

Patented Feb. 9, 1909.
2 SHEETS—SHEET 2.

WITNESSES:
J. H. Gardner
M. D. Beaty

INVENTOR:
James D. Devoss,
BY E. T. Silvius,
ATTORNEY.

UNITED STATES PATENT OFFICE.

JAMES D. DEVOSS, OF INDIANAPOLIS, INDIANA.

COOLER AND ASPIRATOR.

No. 911,952.        Specification of Letters Patent.        Patented Feb. 9, 1909.

Application filed January 17, 1908. Serial No. 411,227.

*To all whom it may concern:*

Be it known that I, JAMES D. DEVOSS, a citizen of the United States, residing at Indianapolis, in the county of Marion and State of Indiana, have invented certain new and useful Improvements in a Cooler and Aspirator; and I do declare the following to be a full, clear, and exact description of the invention, reference being had to the accompanying drawings, and to the letters and figures of reference marked thereon, which form a part of this specification.

This invention relates to apparatus for separating substances of light weight from relatively heavier substances by means of air currents and in the operation of which the substances may be cooled, the invention having reference particularly to a combined cooler and aspirator for hominy, grits, meal or various grains, after having been heated.

The object of the invention particularly is to provide a combined cooler and aspirator which may be constructed at moderate cost and be highly efficient, durable and economical in use, and having a wide range of usefulness for separating and cooling various substances other than those above-mentioned.

The invention comprises a structure having a vertical passageway for the substances, the walls of the passageway having slanting plates arranged alternately at opposite sides of the passageway, so as to repeatedly check the progress of the grain or other substance in its passage, the walls of the passageway being provided with valves through which air may pass to a chamber provided in the structure, the top or roof of the chamber having a suction fan connected therewith, and the bottom of the chamber being provided with two valves connected together, so as to open or close alternately. And the invention consists also in certain novel parts and in the combinations and arrangements of parts as hereinafter particularly described and defined in the appended claims.

Figure 1:
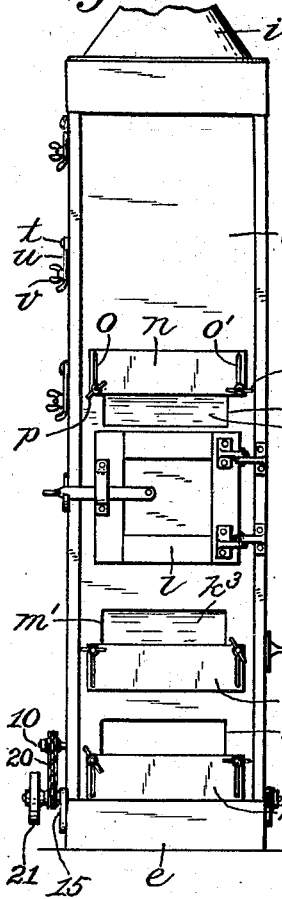
Figure 2:
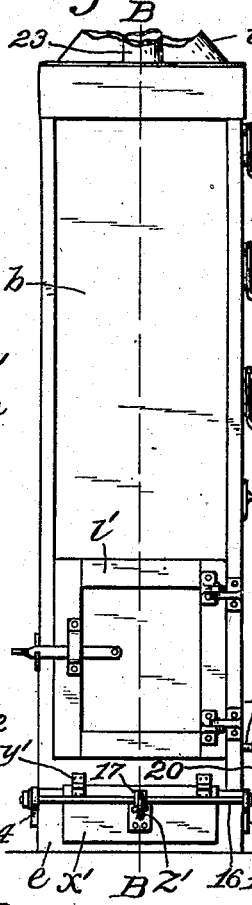
Figure 3:
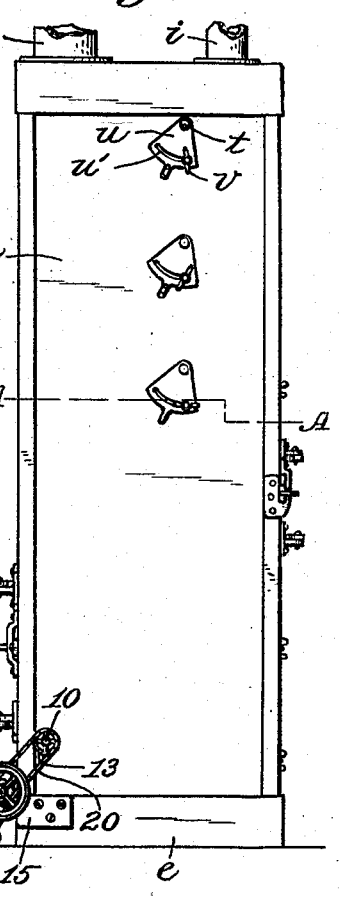
Figure 4:
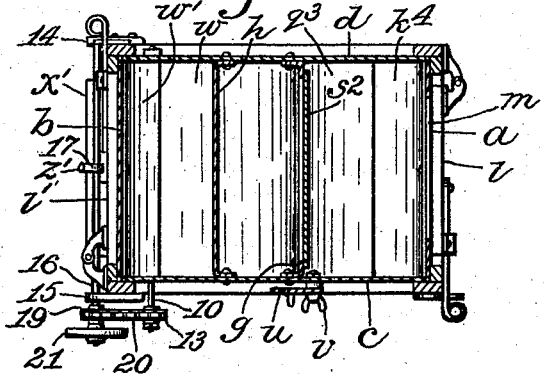
Figure 5:
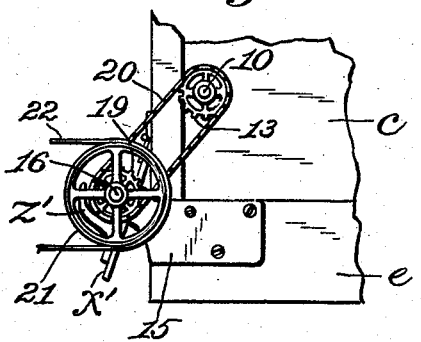
Figure 6:
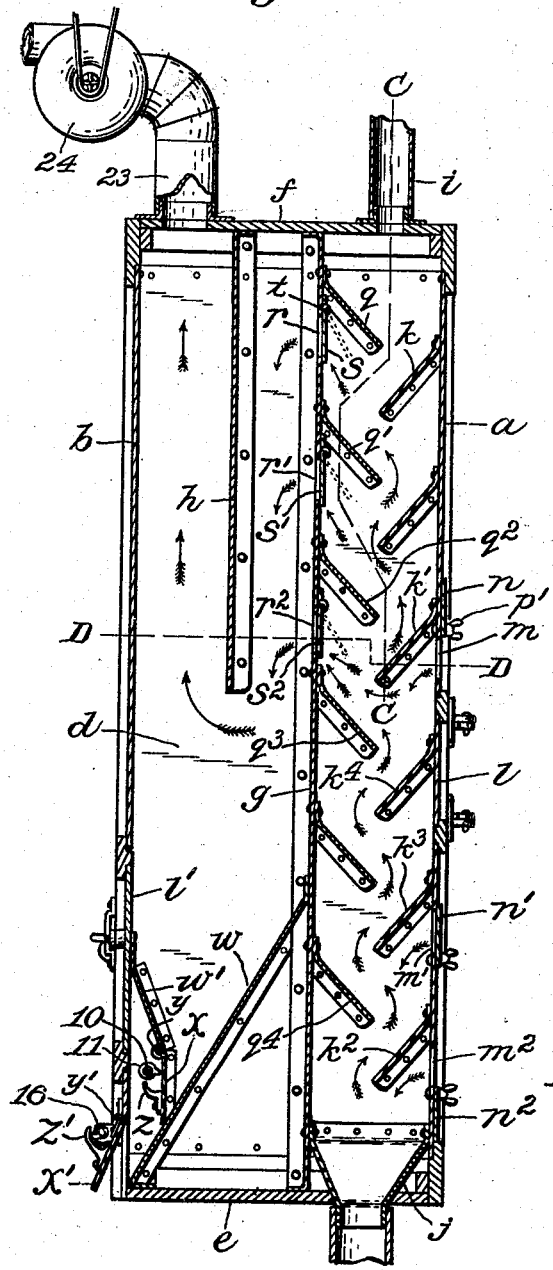
Figure 7:
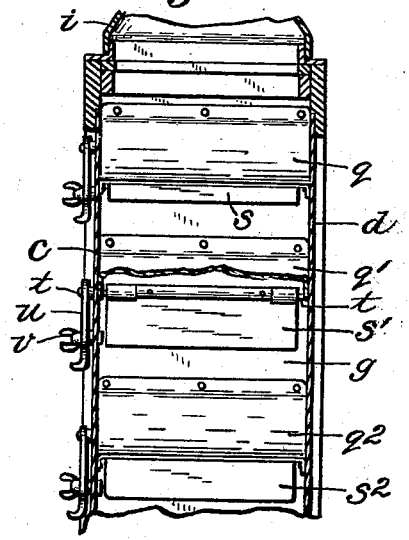
Figure 8:
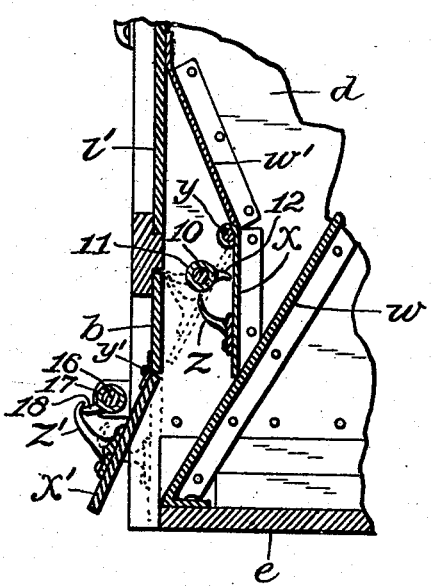

Referring to the drawings Figure 1 is a front end elevation of a combined cooler and aspirator constructed substantially in accordance with the invention; Fig. 2, a rear end elevation thereof; Fig. 3, a side elevation; Fig. 4, a horizontal sectional view approximately on the line A A Fig. 3 (corresponding to the line D D in Fig. 6); Fig. 5, a fragmentary side elevation; Fig. 6, a vertical sectional view on line B B in Fig. 2; Fig. 7, a fragmentary vertical sectional view approximately on the line C C in Fig. 6; and, Fig. 8, a fragmentary sectional view on the line B B in Fig. 2. Figs. 4 to 8 inclusive are drawn to a larger scale than that of the preceding figures.

Similar reference characters in the different figures of the drawings designate corresponding elements or features of construction.

In carrying out the objects of the invention, a suitable upright structure is provided which is preferably rectangular in plan and relatively high, comprising four sides or walls $a\ b\ c\ d$ forming an inclosure with a suitable base $e$ and top $f$, there being a vertical partition $g$ extending from the bottom to the top and between the sides $c$ and $d$, so that a passageway is provided between the sides $c$ and $d$ and the front side $a$ and the partition through which the grain is to fall. A baffle plate or wall $h$ extends opposite to the partition $g$ between it and the rear side $b$, and from the top $f$ downward a suitable distance, being attached to the sides $c$ and $d$, thus dividing the upper portion of the chamber in the rear part of the structure. The top $f$ has an inlet pipe $i$ connected thereto for receiving the grain from any desired source and conveying it to the passageway above-mentioned. The structure forming said passageway has a hopper bottom $j$ through which the heavier particles of the substance may pass for delivery to the mill or elsewhere as may be desired. A suitable number of plates as $k\ k'\ k^2\ k^3\ k^4$ are joined to the front side $a$ and also to the other sides $c$ and $d$ and extend downwardly towards the partition $g$ slightly beyond the middle of the passageway, and access may be had to the passageway by means of a door $l$ which is suitably hung to the front $a$, the front having a suitable number of openings therein as $m\ m'\ m^2$ arranged in the lower portion thereof and adapted to be closed entirely or partially by means of adjustable gates as $n\ n'\ n^2$, each gate having slots $o$ and $o'$ therein receiving securing screws $p$ and $p'$, as shown particularly in Fig. 1, the gates being adapted to regulate the admission of air into the passage way, and are preferably arranged immediately below several of the slanting deflecting plates as $k^2\ k^3$. A suitable number of similar deflecting plates as $q\ q'\ q^2\ q^3\ q^4$ are joined to the partition $g$ and the sides $c$ and $d$, and extend downwardly from the partition towards the front $a$ between the deflecting plates thereon and extending slightly beyond the middle of the passageway. It will thus be seen that the deflecting plates serve as obstructions and prevent grain from falling uninterruptedly through the passageway. The partition $g$ has a number of openings as $r\ r'\ r^2$ therein preferably below several of the deflecting plates, and may be closed by hinged gates as $s\ s'\ s^2$ which are adapted to be held open to any required extent independently by means of hinge rods $t$, to which the gates are secured, and arms $u$ secured to the hinge rods for adjusting them rotatively, the arms having each a slot $u'$ therein receiving a securing screw $v$ for fastening the arm and preventing movement of the gate when adjusted in its open position.

The rear side $b$ is provided with a door $l'$ for gaining access to the interior of the rear portion of the structure, and the rear portion has a slanting floor $w$ extending from the partition $g$ downward to the rear side $b$. A partition $w'$ extends from the door $l'$ downwardly towards the bottom $w$ and is attached to the sides $c$ and $d$, but not to the door, being suitably inclined and leaving a space between the partition $w'$ and the bottom $w$ that may be closed by a gate or valve $x$ hung on a hinge rod $y$ and normally closing the opening as it hangs by gravity against the floor $w$. Another gate or valve $x'$ is hung on hinges $y'$ that are mounted on the rear side $b$, there being an opening in the rear side in the lower portion thereof at the lower end of the floor $w$, and the opening therefore may be closed by the gate $x'$ which normally is held in closed position by gravity. The outer side of the gate $x$ is provided with a curved arm $z$, and the gate $x'$ is provided with a similar arm $z'$, for opening the gates. A shaft 10 is rotatively mounted in the sides $c$ and $d$ near the front of the gate $x$ and has a collar 11 secured thereto that is provided with a finger 12 adapted to engage the arm $z$ when the shaft rotates to draw the gate $x$ open, and then passing on permit the gate to drop to its closed position. A sprocket wheel 13 is secured to the shaft 10 at the outer side of the side $c$ for rotating the shaft. Suitable brackets 14 and 15 are mounted on the lower portion of the structure and rotatively support a shaft 16 having a collar 17 secured thereto and provided with a finger 18 to engage the arm $z'$ for opening the gate $x'$. A sprocket wheel 19 is secured to the shaft 16 and is connected by a drive chain 20 with the sprocket wheel 13, the shaft 16 having also a pulley 21 attached thereto and driven by a belt 22. The collars 17 and 11 carry the fingers 18 and 12 respectively thereon so as to permit of either gate being closed before the other gate is opened, and thus prevent air currents from passing up into the chamber in the rear part of the structure, the top of the chamber being provided with an outlet pipe 23 that is connected to the top $f$ and has a suction fan 24 connected therewith, so that a partial vacuum may be formed throughout the structure and particularly in the chamber in the rear part thereof.

In practical use, the grain or other substance is delivered through the pipe $i$ and is deflected from one to another of the deflecting plates as $q$ and $k$ successively, and the suction fan being in operation the gates on the front $a$ will be suitably adjusted to admit the desired quantity of air which will be drawn upwardly through the falling grain or substance and out through the openings in the partitions $g$, drawing with it lighter particles, such as bran, and the heavier particles of this will descend to the bottom $w$ while the lighter particles will be drawn out through the pipe 23, the substances being rapidly cooled by the air currents. The power will be suitably applied to the belt 22, so that the gates $x$ and $x'$ will open and close alternately, and permit the tailings to escape past the gate $x'$.

By the use of the above-described apparatus great advantages will be obtained over the practice of conveying the grain or other substance direct to the reels while yet warm and there separated.

Having thus described the invention, what is claimed as new is—

1. A cooler and aspirator comprising an apertured front wall and a rear wall having an opening at the lower end thereof, two side walls joined to the front and rear walls, an apertured top on the walls, an apertured partition between the front and rear walls and joined to the side walls, a slanting floor joined to the side walls and extending from the rear wall below the opening therein up to the partition, an inclined partition extending from the rear wall above the opening therein downward towards the slanting floor, a gate hinged to the rear wall above the opening therein and provided with an operating arm, a gate hinged at the lower end of the inclined partition to engage the slanting floor and provided with an operating arm, movable devices for engaging the operating arms to operate the gates, means for connecting the movable devices together to move them in unison, and means for actuating the movable devices.

2. A cooler and aspirator comprising an apertured front wall and a rear wall having an opening at the lower end thereof, two side walls joined to the front and rear walls, an apertured top on the walls, an apertured partition between the front and rear walls and joined to the side walls, a slanting floor joined to the side walls and extending from the rear wall below the opening therein up to the partition, an inclined partition extending from the rear wall above the opening therein downward towards the slanting floor, a gate hinged to the rear wall above the opening therein and having an arm attached thereto, a shaft mounted rotatively at the outer side of the rear wall and having a finger thereon to engage the arm, a gear wheel secured to the shaft, a gate hinged at the lower end of the inclined partition to engage the slanting floor and having an arm thereon, a shaft mounted rotatively between the rear wall and the slanting floor and having a finger thereon to engage the arm of the last-mentioned gate, the last-mentioned shaft having a gear wheel secured thereto that is connected operatively with the first-mentioned gear wheel, and means for turning said shafts to operate said gates.

3. A cooler and aspirator comprising a front wall and a rear wall, two side walls joined to the front and rear walls, the front wall having openings therein, the rear wall having an opening therein at the lower end thereof, deflecting plates attached to the inner side of the front wall, a top on the walls having an opening therein adjacent to the front wall and also an opening adjacent to the rear wall, a partition between the front and rear walls and joined to the side walls in a plane between the openings that are in said top and having openings in the upper portion thereof, deflecting plates attached to the side of the partition that is opposite to the front wall, a slanting floor joined to the side walls and extending from the rear wall below the opening therein upward to the partition, an inclined partition extending from the rear wall above the opening therein downward towards the slanting floor, a gate hinged to the rear wall above the opening therein and having an arm attached thereto, a shaft mounted rotatively at the outer side of the rear wall and having a finger thereon to engage the arm, a sprocket wheel secured to the shaft, a gate hinged at the lower end of the inclined partition and having an arm thereon, a shaft mounted rotatively between the rear wall and the slanting floor and having a finger thereon to engage the arm of the last-mentioned gate, the last-mentioned shaft having a sprocket wheel secured thereto, a sprocket chain connected to the two sprocket wheels, and means for turning said shafts to operate said gates.

In testimony whereof, I affix my signature in presence of two witnesses.

JAMES D. DEVOSS.

Witnesses:
 WM. H. PAYNE,
 E. T. SILVIUS.